United States Patent [19]

Stark

[11] Patent Number: 5,609,513
[45] Date of Patent: Mar. 11, 1997

[54] CLEANING AND DRESSING FLY LINES

[75] Inventor: John E. Stark, Maplewood, Minn.

[73] Assignee: Minnesota Mining and Manufacturing Company, St. Paul, Minn.

[21] Appl. No.: 225,545

[22] Filed: Apr. 11, 1994

[51] Int. Cl.$^6$ .............................. B24B 1/00; B24D 15/04
[52] U.S. Cl. ........................... 451/59; 451/539; 451/909; 43/4; 7/106
[58] Field of Search ................................ 451/59, 28, 909, 451/533, 536, 539, 528, 526, 523, 524, 537; 7/106; 43/1, 4

[56] References Cited

U.S. PATENT DOCUMENTS

| | | | |
|---|---|---|---|
| 2,093,680 | 9/1937 | Lamplough | 451/909 |
| 2,650,158 | 8/1953 | Eastman | 451/539 |
| 4,796,372 | 1/1989 | Klein | 43/4 |
| 5,429,545 | 7/1995 | Meyer | 451/523 |

FOREIGN PATENT DOCUMENTS

| | | | |
|---|---|---|---|
| 0724744 | 2/1955 | United Kingdom | 451/539 |

*Primary Examiner*—Robert A. Rose
*Attorney, Agent, or Firm*—Gary L. Griswold; Walter N. Kirn; William L. Huebsch

[57] ABSTRACT

Fly lines become dirty in use and need to be cleaned periodically. A fly line can retain good shootability for a longer period of time when cleaned by a flexible, pliable abrasive article bearing abrasive granules having diameters substantially within the range of 5 to 30 μm. Microscopic examination shows that the cleaning leaves longitudinal striations along the surface of the line. The abrasive article can have a backing of a nonwoven mat of fibers bearing of composite of the abrasive granules in a binder. The uncoated face of the backing can be laminated to a spongelike substrate such as an open-cell polymeric foam by which a lubricant can be applied to a freshly cleaned fly line.

4 Claims, 1 Drawing Sheet

CLEANING AND DRESSING FLY LINES

CROSS-REFERENCE TO RELATED APPLICATION

U.S. patent application Ser. No. 07/938,416 filed Aug. 31, 1992, by Lucker et al. and assigned to the assignee company of the present application (the content whereof is incorporated herein by reference) discloses how to manufacture an abrasive article for use in practicing the present invention.

FIELD OF THE INVENTION

The invention primarily relates to methods for cleaning fly lines or any fishing lines that, like fly lines, have generally or substantially cylindrical surfaces. The invention also relates to articles that can be used for cleaning and dressing fly or fishing lines.

BACKGROUND OF THE INVENTION

U.S. Pat. No. 4,505,952 (Chambley) says: "The line used in fly fishing is conventionally of large-diameter braided construction, generally having an outer coating of plastic applied thereon. The diameter of this line is on the order of 1/32 to 1/16 inch. It is the weight of the line, not that of the lure, whose forward momentum propels the lure and which by slippage of the predetermined amount of slack line through the rod guides, extends the casting distance. It is generally desirable that the line used in fly fishing float on top of the water's surface. It is for this reason that there has been for many years a practice of coating the heavy braided fly line with a wax-like substance. This has the dual purpose of cleaning the line of debris, and simultaneously coating the line with a high surface tension wax-like substance which causes the line to float" (col. 2, lines 7–25). In addition to the above-described fly lines that have a braided core, other fly lines now on the market have a monofilament core. The aforementioned "outer coating of plastic" (here called the "casing") typically is polymeric, either poly(vinyl chloride) or poly(urethane). Because its casing is substantially cylindrical, a fly line can be called a "cylindrical fishing line."

The casing of a fly line can be filled with hollow microspheres to impart buoyancy. See U.S. Pats. No. 3,486,266 (Richardson et al.); 3,512,294 (Howald) and 3,868,785 (Foote). In the Foote patent, the substantially cylindrical casing is tapered. The casings of some fly lines are filled with metal particles to make them sink.

I believe that all fly lines now on the market have a lubricating dressing that enhances shootability, that is, the ability to propel a fly line and its fly. Lubricating dressings now on the market include topical silicones, fluorocarbons, and waxes that reduce the coefficient of friction (COF) of the fly line in contact with stainless steel of which most rod guides are made. Those dressings also can enhance flotation. After a period of use, the dressing wears off and the line becomes dirty. The user then cleans and dresses the dirty line with a piece of cloth to which a lubricating has been applied.

Fly lines, when new, usually can be used all day before they need to be cleaned and dressed, and this can be done at home when needed. After repeated use, most fly lines need to be cleaned and dressed more often, typically after about four hours of fishing, so that it may be necessary to dress the line in the field. This not only is inconvenient to the user, but there is a hazard of harming the environment by spilling the dressing.

The inconvenience of dressing a fly line in the field can be avoided when its polymeric casing has been pre-impregnated with a lubricating dressing that gradually migrates to the surface. A series of such fly lines is being marketed as Scientific Anglers™ Ultra[3] by the company to which this application is assigned. However, to avoid problems associated with dressing conventional fly lines in the field, there continues to be a need to lengthen the time before it becomes because necessary to dress fly lines that have not been pre-impregnated with a lubricating dressing.

I am not aware of any study of the reflectivity of fly lines or the effect of the dressing on reflectivity, but there is a concern among fishermen that smooth cylindrical surfaces of fly line casings can cause reflections that could "spook" or frighten the fish away.

SUMMARY OF THE INVENTION

The present invention meets the above-stated need to lengthen the time before a conventional fly line needs to be newly dressed, doing so by cleaning the fly line with a flexible, pliable abrasive article that has a backing bearing abrasive granules having diameters substantially within the range of 5 to 30 µm.

By "flexible" is meant that the abrasive article can he repeatedly folded upon itself without breaking or otherwise becoming damaged. By "pliable" is meant that the working surface of the abrasive article can substantially conform to the surface of a fly line. Preferably, the abrasive article is sufficiently pliable that its working surface can conform to the thinnest fly lines, some of which are only about 25 mils (0.65 mm) in diameter.

Microscopic examination of the surface of a fly line that has been cleaned with the flexible, pliable abrasive article reveals longitudinal striations along the surface of the line. Visual examination with the naked eye suggests that the striations make the fly line less reflective of light than it was before cleaning, but it is not known whether the water which wets a fly line in use might reduce or eliminate any anti-reflective advantage. No test of reflectivity has been made under conditions simulating use in the field.

Laboratory tests suggest that after using the flexible, pliable abrasive article to clean a conventional fly line and then applying a lubricating dressing, the fly line should be usable all day, even after being used and cleaned many times, thus avoiding any need to dress the line in the field. It has been suggested that this improved performance may result from the mechanical effect of the striations on the adhesion of the lubricating dressing to the fly line.

When the flexible, pliable abrasive article is used to clean a fly line that has a polymeric casing pre-impregnated with a lubricating dressing, the abrasive article exposes fresh lubricating dressing to the newly cleaned surface and makes the fly line virtually as good as new.

As a convenience to the user, the uncoated face of the backing of the pliable abrasive article can be laminated to a spongelike substrate by which lubricating dressing can be applied to a freshly cleaned fly line. Useful spongelike substrates include plastic foams, soft fibrous mats and loosely woven cloth. Like the abrasive article, the spongelike substrate, after being laminated to the backing, should be able to withstand being folded upon itself repeatedly without breaking or otherwise becoming damaged. The abrasive article and spongelike substrate can be laminated to each other by a double-coated pressure-sensitive adhesive tape or by a pressure-sensitive adhesive layer of a transfer tape.

The backing of the flexible, pliable abrasive article preferably is a fibrous mat such as a nonwoven mat of fibers as disclosed in the above-cited Lucker patent application. Useful fibers can be staple-bonded, spun-bonded, melt-blown, wet laid, needle-punched or thermo-bonded and include glass, carbon, mineral, organic, and ceramic fibers. Preferred organic fibers include polymeric, cellulosic, jute, and hemp fibers. The fibers can be bonded together either autogenously or by an adhesive. The individual fibers preferably are from 4 to 20 mils (10 to 50 µm) in diameter, and the thickness of the nonwoven mat preferably is from 25 to 800 µm, more preferably between 100 and 375 µm. A nonwoven mat typically is porous, having a void volume of 15% or more.

Other useful backings include woven fabrics and polymeric films and foams.

Preferred abrasive granules have a MOH hardness of at least 7, more preferably at least 8, and include aluminum oxide, chromium oxide, silicon carbide, alumina zirconia, diamond, ceria, cubic boron nitride, and garnet. Preferably the abrasive granules have a substantially uniform diameter of from 10 to 20 µm. Granules substantially above 20 µm in diameter might mar the fly line with deep scratches and thus shorten its useful life. Granules substantially below 10 µm in diameter are only marginally effective in cleaning the fly line, and the longitudinal striations they create are barely visible under a microscope.

The abrasive granules can be uniformly distributed in a binder as a composite bonded to the backing, e.g., by coating a slurry of granules and binder onto the backing. Preferably there are from 5 to 50 g/m$^2$ of abrasive granules in the composite. A flexible, pliable abrasive article having an abrasive coating weight substantially below that range would not clean fly lines effectively, whereas a coating weight substantially above that range would be wasteful of abrasive granules and might make the abrasive article undesirably stiff.

When the backing is porous, the abrasive granules can be incorporated into the backing. Doing so can be wasteful, because abrasive granules in a composite at a surface of the backing afford more effective cleaning than can same amount of abrasive granules incorporated into a porous backing.

DETAILED DESCRIPTION

Figure 1:
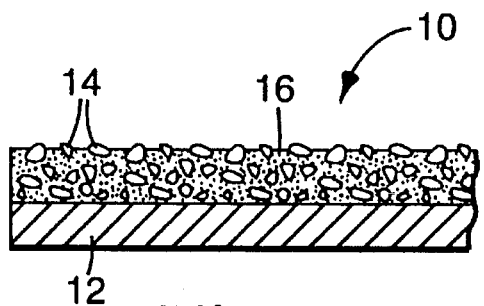
FIG. 1 is illustrated a cross section through an abrasive article according to the present invention that can be used for cleaning fly lines.

Referring to FIG. 1 there is illustrated a flexible, pliable abrasive article 10 according to the present invention that comprises a porous backing 12 in the form of a nonwoven fibrous mat having opposite major surfaces, and a composite abrasive layer comprising abrasive granules 14 uniformly distributed throughout a binder 16 adhered to one of the surfaces of the porous backing 12. The abrasive article should have a size measured along the major surfaces that is convenient to use and to store in a users pocket (e.g. a users vest pocket), such as 2.5 by 3.5 inches.

Figure 2:
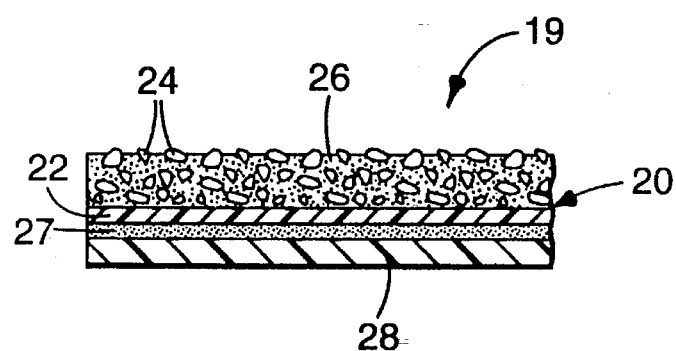
FIG. 2 is illustrated a cross section through a laminate of an abrasive article according to the present invention and a spongelike substrate, which laminate can be used for both cleaning and dressing fly lines.

Referring to FIG. 2 there is illustrated a laminate 19. The laminate 19 includes a flexible, pliable abrasive article 20 according to the present invention that comprises a backing 22 in the form of a polymeric film having opposite major surfaces, and a composite abrasive layer comprising abrasive granules 24 uniformly distributed throughout a binder 26 adhered to one of the surfaces of the backing 22. The laminate 19 further includes a layer 27 of pressure-sensitive adhesive and a piece 28 of polymeric foam adhered to the surface of the backing 22 opposite the abrasive layer. The laminate can have a size measured along said major surfaces that is similar to the size of the abrasive article 10 described above.

Figure 3:
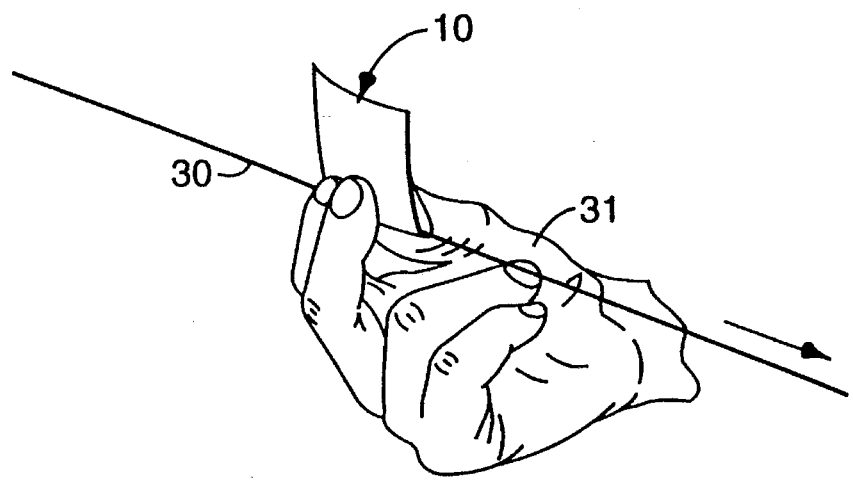
FIG. 3 is a perspective view of a fly line being cleaned by a person using an abrasive article according to the present invention.

In FIG. 3 there is illustrated a method according to the present invention for cleaning a fly or other fishing line 30 having a generally cylindrical surface, which method comprising the steps of (1) providing a flexible, pliable abrasive article such as one of the abrasive articles 10 or 20 illustrated in FIGS. 1 and 2; (2) manually pressing the abrasive granules 14 or 24 of the abrasive article 10 or 20 against the surface of the line 30 as with a persons hand 31; and (3) causing relative movement longitudinally of the line 30 between the abrasive article 10 or 20 and the surface of the fishing line 30 during the pressing step. Such relative movement can be caused by pulling the line 30 longitudinally past the abrasive article 10 or 20, but could alternatively be caused by moving the abrasive article longitudinally along the surface of the line 30. The step of pressing the abrasive granules 14 or 24 of the abrasive article 10 or 20 against the surface of the line 30 can comprise the steps of using the persons hand 31 to fold the abrasive article 10 or 20 around and conform the abrasive article to the surface of the line 30 with the abrasive granules 14 or 24 against the surface of the line 30; and to press the abrasive article 10 or 20 against the surface of the line 30 with sufficient force (e.g., as much force or pressure as can comfortably be applied between the thumb and the index finger) to form longitudinal striations along the surface of the line 30.

EXAMPLE 1

A flexible, pliable abrasive article 10 as shown in FIG. 1 has been made as disclosed in Examples 1–3 of the above-cited Lucker patent application except that the abrasive granules (white aluminum oxide) had an average diameter of 15 µm and the abrasive coating weight was 23.9 g/m$^2$. The nonwoven fibrous mat 12 was the polyester and cellulose fibers, 7.2 mils (180 µm thick) available as Hovotex™ 9915 from Hollingsworth & Vose, East Walpole, Mass. The binder 16 employed ethylcellulose resin available from Dow Chemical as Ethocel™, polyester resin available from Goodyear as Vitel™ PE-200, polymethylene polyphenyl isocyanate available from Mobay as PAPI 135, and a gamma mercaptopropylmethoxysilane coupling agent available from Union Carbide as A-189. The coatable slurry employed:

80 kg of white aluminum oxide 22.9 kg of methyl ethyl ketone 49.9 of PE-200

1.4 liters of A-189

23.8 kg of toluene 3.2 kg of ethylcellulose resin 0.45 kg of PAPI 135.

The resulting flexible, pliable abrasive article 10 was used, as illustrated in FIG. 3, to clean a number of dirty fly lines. Each was easily pulled longitudinally through the abrasive article while it was held in the hand, folded around and conformed to the fly line while being manually pressed against the surface of the fly line with as much pressure as can comfortably be applied between the thumb and index finger. Doing so cleaned each fly line. Those that had been pre-impregnated with a lubricating dressing were returned to their original shootability.

Several of the fly lines were examined under a microscope and found to have distinct longitudinal striations.

Comparative Test

Used in this comparative test were a number of dirty fly lines that had been pre-impregnated with a lubricating dressing. Portions of each were cleaned with soap and water in a conventional manner, and other portions were cleaned by being pulled though the folded flexible, pliable abrasive article of Example 1. Coefficients of friction in contact with stainless steel were measured before and after cleaning. Average results were:

Coefficients of Friction

Dirty lines as received: 0.27

After conventional cleaning: 0.16

After cleaning with abrasive article of Example 1 0.12

EXAMPLE 2

A flexible, pliable abrasive article has been made as described in Example 1 except that the backing was biaxially oriented poly(ethyleneterephthalate) film having a thickness of 3 mils (75 μm) thickness. The resulting abrasive article, which was flexible and marginally pliable, was used to clean fly lines, but the user's fingers became uncomfortably warm. Such heating had been minimal during use of the abrasive article of Example 1, apparently because of the greater thickness and porosity of its backing as compared to the nonporous nature of the poly(ethyleneterephthalate) film backing.

The abrasive article of this Example 2 was adjudged to be undesirably stiff and could have been made more flexible and pliable by employing a biaxially oriented polymeric film of lesser thickness, preferably one from 10 to 25 μm in thickness.

Microscopic examination of fly lines that had been cleaned with the abrasive article of this Example 2 showed distinct longitudinal striations.

EXAMPLE 3

The uncoated face of a piece of the flexible, pliable abrasive article of Example 1 was laminated to a polymeric open-cell foam by a layer of double-coated pressure-sensitive adhesive tape. The layer of adhesive tape was 3 mils (75 μm) thick, and the polymeric foam was 0.125 inch (3 mm) thick. Because the foam was as flexible and pliable as the abrasive article, the surface of the abrasive article was readily folded by hand around each of several dirty fly lines and its abrasive coating conformed to their cylindrical surfaces. Upon being pulled longitudinally through the folded laminate, each of the fly lines became clean and showed characteristic longitudinal striations when viewed under a microscope.

A lubricating dressing was daubed onto the foam layer, and several of the fly lines were dressed by being pulled longitudinally between facing foam surfaces of the folded laminate, thus affording excellent shootability.

By laminating the abrasive article of Example 2 (preferably one having a film backing of from 10 to 25 μm in thickness) to a foam layer as in Example 3, the foam layer would insulate the user's fingers from the heat noted in Example 2.

The present invention has now been described with reference to several embodiments thereof. It will be apparent to those skilled in the art that many changes can be made in the embodiments described without departing from the scope of the present invention. Thus the scope of the present invention should not be limited to the structures and methods described in this application, but only by structures and methods described by the language of the claims and the equivalents thereof.

I claim:

1. A method for cleaning a fly line having a generally cylindrical surface, said method comprising the steps of:

providing a flexible, pliable abrasive article including a nonwoven fibrous mat backing formed of individual fibers from 10 to 50 μm in diameter, the nonwoven mat backing having a thickness of from 100 to 375 μm and having first and second major surfaces, and a composite bonded to the first surface of the backing, the composite comprising a binder and 5 to 50 g/m$^2$ of abrasive granules uniformly distributed in the binder, the abrasive granules having diameters substantially within the range 10 to 20 μm and a MOH hardness of at least 8;

folding the abrasive article around and conforming the abrasive article to the surface of the fly line with the abrasive granules against the surface of the fly line;

manually pressing the abrasive granules of the abrasive article against the surface of the fly line during the folding step; and causing relative movement longitudinally of the fly line between the abrasive article and the surface of the fly line during the pressing step.

2. A method according to claim 1 wherein said step of causing relative movement longitudinally of the fly line between the abrasive article and the surface of the fly line includes pulling the fly line longitudinally past the abrasive article.

3. A method according to claim 1 wherein said step of pressing the abrasive granules of the abrasive article against the surface of the fly line comprises pressing the abrasive article against the surface of the fly line with sufficient force to form longitudinal striations along the surface of the fly line.

4. A method according to claim 1 wherein the abrasive granules comprise aluminum oxide.

* * * * *